United States Patent
Bruex

(10) Patent No.: US 11,958,463 B2
(45) Date of Patent: Apr. 16, 2024

(54) METHOD FOR OPERATING A HYDRAULIC POWER VEHICLE BRAKING SYSTEM FOR AUTONOMOUS DRIVING

(71) Applicant: Robert Bosch GmbH, Stuttgart (DE)

(72) Inventor: Thomas Bruex, Sachsenheim-Kleinsachsenheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 258 days.

(21) Appl. No.: 17/623,541

(22) PCT Filed: Apr. 28, 2020

(86) PCT No.: PCT/EP2020/061727
§ 371 (c)(1),
(2) Date: Dec. 28, 2021

(87) PCT Pub. No.: WO2021/008747
PCT Pub. Date: Jan. 21, 2021

(65) Prior Publication Data
US 2022/0355774 A1   Nov. 10, 2022

(30) Foreign Application Priority Data

Jul. 18, 2019   (DE) ................ 10 2019 210 608.0

(51) Int. Cl.
*B60T 8/92*    (2006.01)
*B60T 7/04*    (2006.01)
(Continued)

(52) U.S. Cl.
CPC .............. *B60T 8/326* (2013.01); *B60T 7/042* (2013.01); *B60T 8/885* (2013.01); *B60T 8/92* (2013.01);
(Continued)

(58) Field of Classification Search
CPC . B60T 7/042; B60T 8/88; B60T 8/885; B60T 8/92; B60T 8/94; B60T 8/326;
(Continued)

(56) References Cited

U.S. PATENT DOCUMENTS 4,701,854 A  * 10/1987 Matsuda ................... B60T 8/94
                                                    701/76
2011/0266106 A1 * 11/2011 Suzuki ...................... B60T 8/96
                                                    188/360
(Continued)

FOREIGN PATENT DOCUMENTS

DE             19835881 A1     4/1999
DE         102014220440 A1     7/2015
(Continued)

OTHER PUBLICATIONS

International Search Report for PCT/EP2020/061727, dated Jul. 6, 2020.

*Primary Examiner* — Erick R Solis
(74) *Attorney, Agent, or Firm* — NORTON ROSE FULBRIGHT US LLP; Gerard A. Messina

(57) ABSTRACT

For operation of a hydraulic power vehicle braking system for autonomous driving, a brake pressure is generated using a second power brake pressure generator if, after a predefined first time span, no brake pressure or insufficient brake pressure has been generated using a first power brake pressure generator. The generation of the brake pressure using the second power brake pressure generator is aborted if, within a second time span, which is longer than the first time span, no error message is present from the first power brake pressure generator.

7 Claims, 2 Drawing Sheets

(51) Int. Cl.
*B60T 8/32* (2006.01)
*B60T 8/88* (2006.01)
*B60T 8/94* (2006.01)
*B60T 13/16* (2006.01)
*B60T 17/10* (2006.01)
*B60T 17/22* (2006.01)

(52) U.S. Cl.
CPC .............. *B60T 8/94* (2013.01); *B60T 13/166* (2013.01); *B60T 17/10* (2013.01); *B60T 17/221* (2013.01); *B60T 2270/402* (2013.01); *B60T 2270/403* (2013.01); *B60T 2270/404* (2013.01)

(58) Field of Classification Search
CPC ...... B60T 13/166; B60T 17/10; B60T 17/221; B60T 2270/402; B60T 2270/404
USPC ............................ 701/70, 76, 78, 83, 92, 97
See application file for complete search history.

(56) References Cited

U.S. PATENT DOCUMENTS

| | | | |
|---|---|---|---|
| 2011/0316329 A1* | 12/2011 | Nishino | B60T 7/042 |
| | | | 303/14 |
| 2016/0325719 A1* | 11/2016 | Linhoff | B60T 8/4872 |
| 2016/0339885 A1* | 11/2016 | Linhoff | B60T 8/368 |
| 2018/0029577 A1* | 2/2018 | Beauvais | B60T 8/176 |
| 2019/0071061 A1* | 3/2019 | Kozuka | B60T 13/662 |
| 2019/0168724 A1 | 6/2019 | VandenBerg, III et al. | |
| 2020/0010061 A1* | 1/2020 | Tiwari | B60W 10/192 |
| 2020/0331442 A1* | 10/2020 | Cheon | B60Q 9/00 |
| 2022/0289158 A1* | 9/2022 | Leibbrand | B60T 17/221 |

FOREIGN PATENT DOCUMENTS

| | | |
|---|---|---|
| DE | 102018205957 A1 | 11/2018 |
| JP | S61295167 A | 12/1986 |
| JP | H1148945 A | 2/1999 |
| JP | 2000071960 A | 3/2000 |
| JP | 2007069794 A | 3/2007 |

* cited by examiner

METHOD FOR OPERATING A HYDRAULIC POWER VEHICLE BRAKING SYSTEM FOR AUTONOMOUS DRIVING

FIELD

The present invention relates to a method for operating a hydraulic power vehicle braking system for land vehicles driving autonomously up to level 4 or level 5 on public roads. The term "autonomous driving" relates to the possibility of driving autonomously, however, the vehicle braking system according to the present invention is also usable for land vehicles not driving autonomously or driving autonomously at a lower level.

BACKGROUND INFORMATION

A power vehicle braking system including redundancies, which precludes complete failure of the vehicle braking system with probability bordering on certainty, without requiring a driver intervention, is necessary for autonomous driving up to level 4 (driver may be requested to intervene) and level 5 (highest level; no driver necessary).

German Patent Application No. DE 10 2014 220 440 A1 describes an electrohydraulic power vehicle braking system including two brake assemblies, both of which each include a power brake pressure generator including an electrically drivable pressure source and a brake pressure regulating valve arrangement for each wheel brake. One brake assembly is connected to the other brake assembly and hydraulic wheel brakes are connected to the one brake assembly, so that the wheel brakes are actuatable using the one brake assembly and through the one brake assembly using the other brake assembly. In this way, in the event of an interference or a failure of one brake assembly, the wheel brakes are actuatable using the other brake assembly without driver intervention. The particular active brake assembly regulates the wheel brake pressures in the wheel brakes.

SUMMARY

An object of the present invention is to lose as little time as possible in a power braking system for the buildup of a brake pressure using a second power brake pressure generator if a first power brake pressure generator does not generate any or at least does not generate sufficient brake pressure. In any case in principle not both, but preferably only one power brake pressure generator is always to be operated.

An example embodiment of the vehicle braking system provided for the method according to the present invention includes two power brake pressure generators, using which a brake pressure for actuating hydraulic wheel brakes of the vehicle braking system may be generated. The power brake pressure generators may include a hydraulic pump, which is drivable using an electric motor, or a piston-cylinder unit, whose piston is displaceable in the cylinder using an electric motor via, for example, a worm gear and possibly via an interconnected mechanical step-down gear. A further possibility for a power brake pressure generator is a brake master cylinder, which is actuatable using a controllable vacuum brake booster or an electromechanical brake booster. The list is by way of example and is not exhaustive.

According to an example embodiment of the present invention, a brake pressure is generated using the second power brake pressure generator, if the first power brake pressure generator does not generate a predefined brake pressure after a predefined first time span from receiving a brake signal and the brake signal is still present. The brake signal may be a brake actuation by vehicle driver when braking is to be carried out using power. The brake signal may also be generated independently of a vehicle driver, for example, by an autonomous vehicle controller, by a distance control from a preceding vehicle, or in the event of an excessively rapid approach to another vehicle or another obstacle.

If an error of the first power brake pressure generator is recognized within a second time span from receiving the brake signal, which is longer than the first time span, the wheel brakes may be actuated using the brake pressure which the second power brake pressure generator generates. The time from the end of the first time span until recognizing the error of the first power brake pressure generator is saved. If no error of the first power brake pressure generator is recognized within the second time span, in one embodiment of the method according to the present invention, the generation of the brake pressure using the second power brake pressure generator may be aborted. This prevents the vehicle braking system from being actuated using the second power brake pressure generator although, in spite of the presence of the brake signal, it is not to be actuated or it is not to be actuated by generating a brake pressure using the first power brake pressure generator. For example, the vehicle braking system may be actuated using a third power brake pressure generator, for example, by muscular-energy actuation or power actuation of a brake master cylinder, or a vehicle equipped with the vehicle braking system is decelerated in another way, for example, by power generation by generator operation of an electrical machine and the hydraulic wheel brakes are therefore intentionally not actuated. The electrical machine is, for example, an electric motor operable as a generator or a generator.

The generation of the brake pressure using the second power brake pressure generator may also be aborted using other abort criteria, for example, if the first power brake pressure generator (still) generates a predefined brake pressure within the second time span from receiving the brake signal or a vehicle equipped with the vehicle braking system is stationary or has come to a standstill.

Refinements and advantageous embodiments of the present invention are disclosed herein.

All features disclosed in the description and the drawings may be implemented individually as such or in any arbitrary combination in principle in specific embodiments of the present invention. Embodiments of the present invention which do not include all, but only one or multiple features of a specific embodiment of the present invention are possible in principle.

BRIEF DESCRIPTION OF THE DRAWINGS

The present invention is explained in greater detail hereinafter on the basis of a specific embodiment shown in the figures.

DETAILED DESCRIPTION OF EXAMPLE EMBODIMENTS

Figure 1:
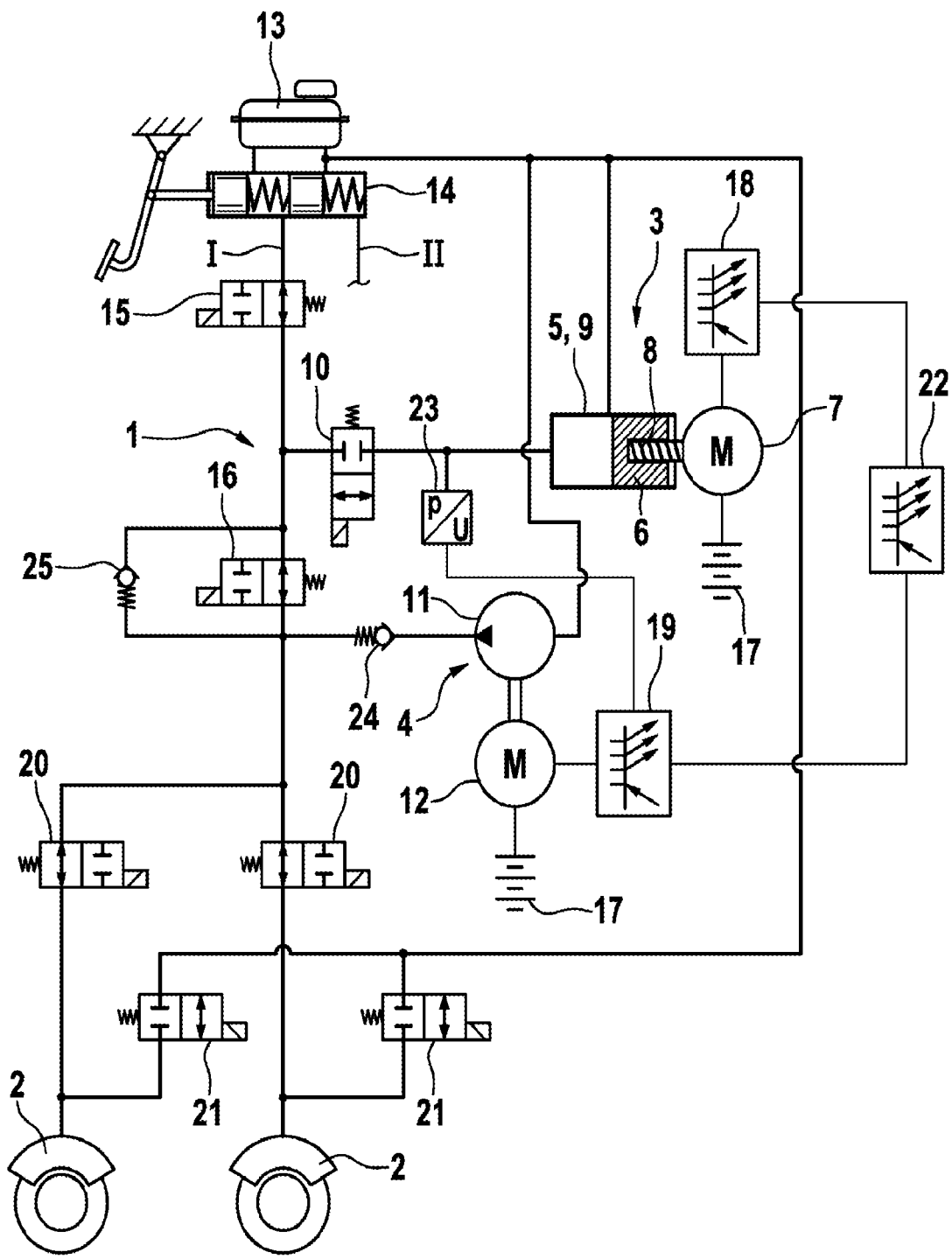
FIG. 1 shows a simplified hydraulic circuit diagram of a hydraulic power vehicle braking system for autonomous driving to carry out the method according to an example embodiment of the present invention.

Electrohydraulic power vehicle braking system 1 shown in FIG. 1 is provided for a land vehicle driving autonomously up to level 4 or 5 on public roads, namely a passenger vehicle. Level 4 means autonomous driving, a driver being able to be prompted to intervene, and level 5, the highest level, means autonomous driving which does not require driver intervention. Lower levels and non-autonomous driving are also possible.

Vehicle braking system 1 is designed as a two-circuit vehicle braking system including four hydraulic wheel brakes 2, each two of which are connected to one of two brake circuits I, II. A brake circuit I including two hydraulic wheel brakes 2 is shown, other brake circuit II is designed identically.

For a power actuation, vehicle braking system 1 includes two power brake pressure generators 3, 4, using which wheel brakes 2 are actuatable independently of one another. A first of the two power brake pressure generators 3 includes a piston-cylinder unit 5, whose piston 6 is displaceable in a cylinder 9 for brake pressure generation using a first electric motor 7 via a worm gear 8, for example, a ball screw drive. A mechanical step-down gear (not shown), for example, a planetary gear, may be interconnected between first electric motor 7 and worm gear 8. The two brake circuits I, II are hydraulically connected in parallel via first separation valves 10, of which only one is shown in the drawings, to cylinder 9 of piston-cylinder unit 5 of first power brake pressure generator 3.

Second power brake pressure generator 4 includes a hydraulic pump 11, which is drivable using a second electric motor 12. Hydraulic pump 11 is, for example, a piston pump or an (internal) gear pump. The two brake circuits I, II are hydraulically connected in parallel to second power brake pressure generator 4, in the exemplary embodiment the two brake circuits I, II are connected to a pressure side of hydraulic pump 11. The two brake circuits I, II may be connected directly without interconnected valve to second power brake pressure generator 4, in the exemplary embodiment, the two brake circuits I, II are connected by check valves 24 to second power brake pressure generator 4 to prevent a backflow of brake fluid from brake circuits I, II into or through second power brake pressure generator 4. Controllable valves, for example, solenoid valves, between second power brake pressure generator 4 and the two brake circuits I, II (not shown) are not provided but are possible. Both cylinder 9 of piston-cylinder unit 5 of first power brake pressure generator 3 and also hydraulic pump 11 of second power brake pressure generator 4 are connected to a depressurized brake fluid storage container 13, which is attached to a two-circuit brake master cylinder 14 actuatable by muscular energy, to which the two brake circuits I, II are hydraulically connected in parallel via second separation valves 15.

In each brake circuit I, II, a third separation valve 16, to which a check valve 25 through which flow can occur in the direction of wheel brakes 2 is hydraulically connected in parallel, is situated between first and second separation valves 10, 15, on the one hand, and wheel brakes 2 and second power brake pressure generator 4.

Each power brake pressure generator 3, 4 includes a separate electrical power supply 17—in the exemplary embodiment an accumulator in each case—and a separate electronic control unit 19.

Each wheel brake 2 includes an inlet valve 20, by which wheel brake 2 is connected to brake circuit I, II of vehicle braking system 1 with which it is associated. Each wheel brake 2 is connected via one outlet valve 21 in each case to depressurized brake fluid storage container 14. Inlet valves 20 and outlet valves 21 form wheel brake pressure regulating valve arrangements, using which wheel brake pressures may be individually regulated in each wheel brake 2, a regulation also being understood to include a control. In addition to a regulation of the wheel brake pressures in the event of power braking, a slip control is also possible using inlet valves 20, outlet valves 21, and alternately one of the two power brake pressure generators 3, 4. Such slip controls are antilock braking systems, anti-slip regulations, and vehicle dynamics control or electronic stability programs, for which the abbreviations ABS, ASR, and VDC or ESP are typical. Such slip regulations are conventional to a person skilled in the art and will not be explained here.

In the exemplary embodiment, separation valves 10, 15, 16, inlet valves 20, and outlet valves 21 are 2/2-way solenoid valves, second and third separation valves 15, 16 and inlet valves 20 being open in their deenergized normal positions and first separation valves 10 and outlet valves 21 being closed in their deenergized normal positions. Other valves and valve positions than those described are possible. For example, inlet valves 20 and outlet valves 21 may be combined to form 3/3-way solenoid valves (not shown). Valves 10, 13, 16, 20, 21 of brake circuit I shown are shown in each case, brake circuit II (not shown) is constructed identically and includes the same valves 10, 15, 16, 20, 21.

Figure 2:
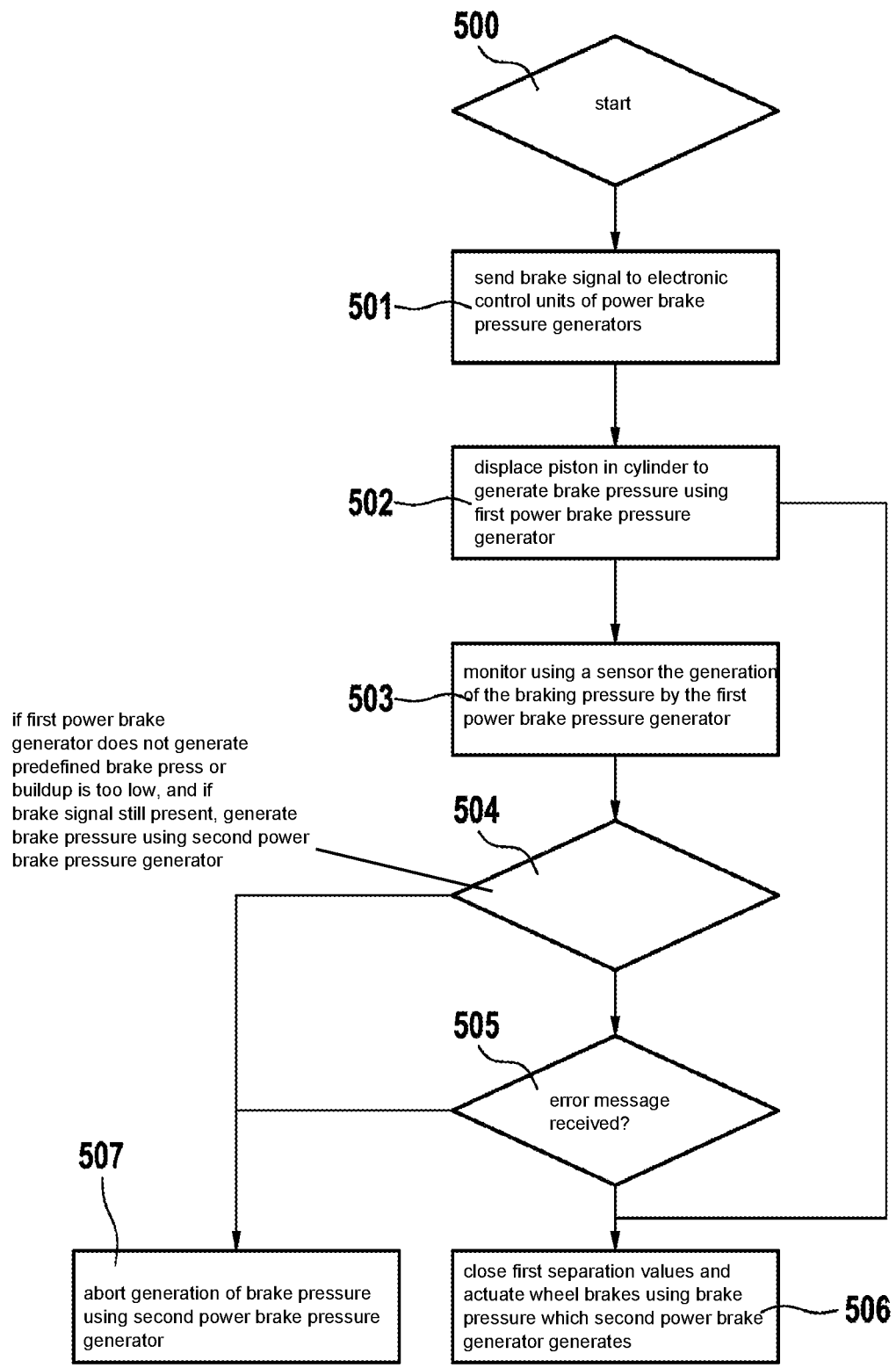
FIG. 2 shows a flowchart of the method according to an example embodiment of the present invention.

The flowchart of FIG. 2, which starts with field 500, shows the sequence of the autonomous power braking according to the present invention. For autonomous driving, an autonomous vehicle controller 22 is provided, which is not necessarily part of vehicle braking system 1 and which, in a step 501, sends a brake signal to electronic control units 18, 19 of the two power brake pressure generators 3, 4. The brake signal means that vehicle braking system 1 is to be actuated using external power. Piston 6 is thereupon displaced in cylinder 9 of piston-cylinder unit 5 using first electric motor 7 and thus a brake pressure is generated using first power brake pressure generator 3 (step 502). First separation valves 10 are opened and third separation valves 16 remain open, so that wheel brakes 2 may be actuated using the brake pressure which first power brake pressure generator 3 generates. Second separation valves 15 are closed so that wheel brakes 2 are hydraulically separated from brake master cylinder 15 and power braking may take place using the brake pressure which first power brake pressure generator 3 generates.

Electronic control unit 19 of second power brake pressure generator 4 monitors the generation of the brake pressure using first power brake pressure generator 3 with the aid of a pressure sensor 23, which is connected to cylinder 9 of piston-cylinder unit 5 of first power brake pressure generator 3 (step 503). In addition to electronic control unit 19 of second power brake pressure generator 4, pressure sensor 23 also sends its pressure signals to electronic control unit 18 of first power brake pressure generator 3 and to autonomous vehicle controller 22.

If first power brake pressure generator 3 does not generate any brake pressure or in any case does not generate a predefined brake pressure or a brake pressure buildup gradient is too low during a first, predefined time span $t_1$ from the beginning of the brake signal and if the brake signal of autonomous vehicle controller 22 is still present, a brake pressure is generated using second power brake pressure generator 4 by driving hydraulic pump 11 using second electric motor 12 (step 504).

If electronic control unit 19 of second power brake pressure generator 4 receives an error message of first power brake pressure generator 3 within a predefined second time span $t_2$ from beginning of the brake signal, which is longer than first time span $t_1$ (step 505), first separation valves 10 of first power brake pressure generator 3 are closed and wheel brakes 2 are actuated using the brake pressure which second power brake pressure generator 4 generates (step 506). An error message first power brake pressure generator 3 means that first power brake pressure generator 3 has failed or in any case is not capable of generating a sufficient brake pressure in a sufficiently short time. In addition to electronic control unit 18 of first power brake pressure generator 3, the error message may also come, for example, from autonomous vehicle controller 22.

If electronic control unit 18 of second power brake pressure generator 4 does not receive an error message of first power brake pressure generator 3 within second time span $t_2$, the generation of the brake pressure using second power brake pressure generator 4 is aborted (step 507). The reason for no error message may be that the brake pressure is not to be generated using first power brake pressure generator 3 in spite of the brake signal. This is the case, for example, if current is generated using an electric motor operated as a generator or using a generator to obtain electrical energy and a vehicle equipped with vehicle braking system 1 is decelerated sufficiently using the electric motor or the generator in this way. In this case, an actuation of wheel brakes 2 using second power brake pressure generator 4 would interfere.

The generation of the brake pressure using second power brake pressure generator 4 may also be aborted if first power brake pressure generator 3 generates a sufficient brake pressure within second time span $t_2$ from the beginning of the brake signal, the vehicle is decelerated sufficiently in spite of absent or excessively low brake pressure generation or is stationary or has come to a standstill.

If the error message of first power brake pressure generator 3 is already present at the beginning of the brake signal or within first time span $t_1$ from the beginning of the brake signal (step 502), the brake pressure is generated using second power brake pressure generator 4 from the beginning of the brake signal or from receiving the error message (step 506). The brake pressure is also generated using second power brake pressure generator 4 from the beginning of the brake signal if first power brake pressure generator 3 is not available for a reason other than due to an error or in any case without an error message (steps 502 and 506).

What is claimed is:

1. A method for operating a hydraulic power vehicle braking system for autonomous driving, which includes a first power brake pressure generator and a second power brake pressure generator, to which a hydraulic wheel brake is connected, the method comprising the following steps:

generating, in the event of a brake signal, a brake pressure using the second power brake pressure generator when, after a predefined first time span from receiving the brake signal, the first power brake pressure generator does not generate a predefined brake pressure and the brake signal is still present.

2. The method as recited in claim 1, wherein the generation of the brake pressure using the second power brake pressure generator is aborted when, within a second predefined time span from receiving the brake signal, which is longer than the first time span, no error message of the first power brake pressure generator is present.

3. The method as recited in claim 1, wherein the generation of the brake pressure using the second power brake pressure generator is aborted when, within s predefined second time span from receiving the brake signal, which is longer than the first time span, the first power brake pressure generator generates a predefined brake pressure or a vehicle equipped with the vehicle braking system is stationary.

4. The method as recited in claim 1, wherein the brake pressure is generated using the second power brake pressure generator immediately upon receiving the brake signal when the first power brake pressure generator is not ready to generate a brake pressure.

5. The method as recited in claim 1, wherein the brake pressure is generated using the second power brake pressure generator immediately upon receiving the brake signal when an error message of the first power brake pressure generator is present.

6. The method as recited in claim 1, wherein the method is not carried out if a predefined brake pressure is generated in a way other than using the first power brake pressure generator and/or a vehicle equipped with the vehicle braking system is decelerated at a predefined deceleration in a way other than using the vehicle braking system.

7. The method as recited in claim 1, wherein the first and second power brake pressure generators include electronic control units.

\* \* \* \* \*